United States Patent [19]
Füldner et al.

[11] Patent Number: 5,412,640
[45] Date of Patent: May 2, 1995

[54] METHOD FOR MEASURING AND REGULATING THE RADIAL AND TANGENTIAL ANGLES OF A LIGHT BEAM

[75] Inventors: Friedrich Füldner, Villingen-Schwennigen; Hans-Robert Kühn, St. Georgen; Dieter Storz, Lauterbach, all of Germany

[73] Assignee: Deutsche Thomson-Brandt GmbH, Villengen-Schwennigen, Germany

[21] Appl. No.: 46,968

[22] Filed: Apr. 15, 1993

[30] Foreign Application Priority Data

Sep. 10, 1990 [DE] Germany .................. 40 28 703.3
Sep. 6, 1991 [WO] WIPO ............... PCT/EP91/01699

[51] Int. Cl.⁶ .................................... G11B 7/00
[52] U.S. Cl. ................... 369/100; 369/44.32; 369/106; 369/116; 369/107; 360/75; 360/77.02
[58] Field of Search ............... 250/201.1; 360/75, 76, 360/77.01, 77.06, 77.02; 369/44.15, 44.32, 44.29, 100, 106, 116, 107

[56] References Cited

U.S. PATENT DOCUMENTS

| | | | |
|---|---|---|---|
| 4,634,853 | 1/1987 | Kananaru | 250/201 |
| 4,686,663 | 8/1987 | Kühn | 369/44.15 |
| 4,780,865 | 10/1988 | Yamakawa | 369/44.32 |
| 5,056,075 | 10/1991 | Maruta et al. | 369/44.29 |

FOREIGN PATENT DOCUMENTS

| | | | |
|---|---|---|---|
| 0070070 | 1/1983 | European Pat. Off. | G11B 7/08 |
| 0116467 | 8/1984 | European Pat. Off. | G11B 7/08 |
| 0148028 | 7/1986 | European Pat. Off. | G11B 7/095 |
| 0313818 | 5/1989 | European Pat. Off. | G11B 7/095 |

Primary Examiner—Georgia Y. Epps
Assistant Examiner—Kim-Kwok Chu
Attorney, Agent, or Firm—Joseph S. Tripoli

[57] ABSTRACT

With an optical playback device, for example, with a compact disk player, care should be taken to see that the light beam scanning the data radiates as perpendicular as possible onto the disk. However, as a consequence of disk slap or chattering, the radial and the tangential angles alter during every revolution of the disk. As a result of the tolerances in the disk and the device, the optical axis deviates from the perpendicular in many cases. In order to regulate the radial angle $\phi R$ and the tangential angle $\phi T$, under which the light beam strikes the disk, the data signal is demodulated in an amplitude demodulator. The regulating signal $UR = C^* \sin \phi^* \cos \alpha$ for the radial angle $\phi R$ and the regulating signal $UT = -C^* \cos \phi^* \sin \alpha$ for the tangential angle $\phi T$ are generated from the amplitude C and the phase position $\phi$ of the demodulated data signal.

13 Claims, 17 Drawing Sheets

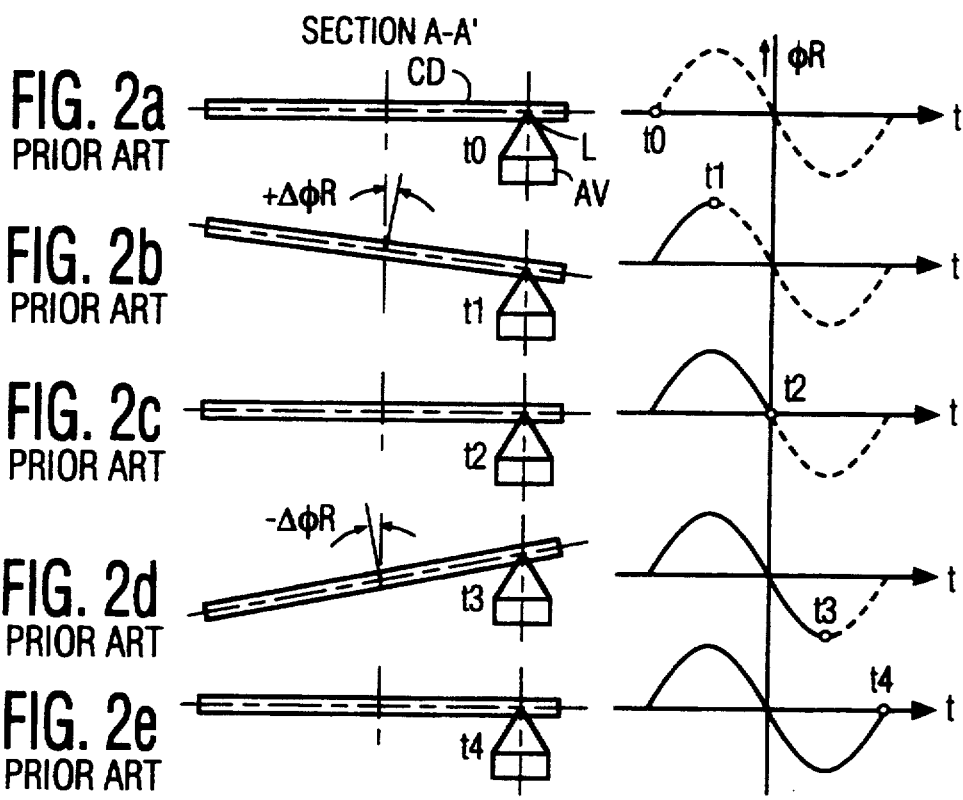
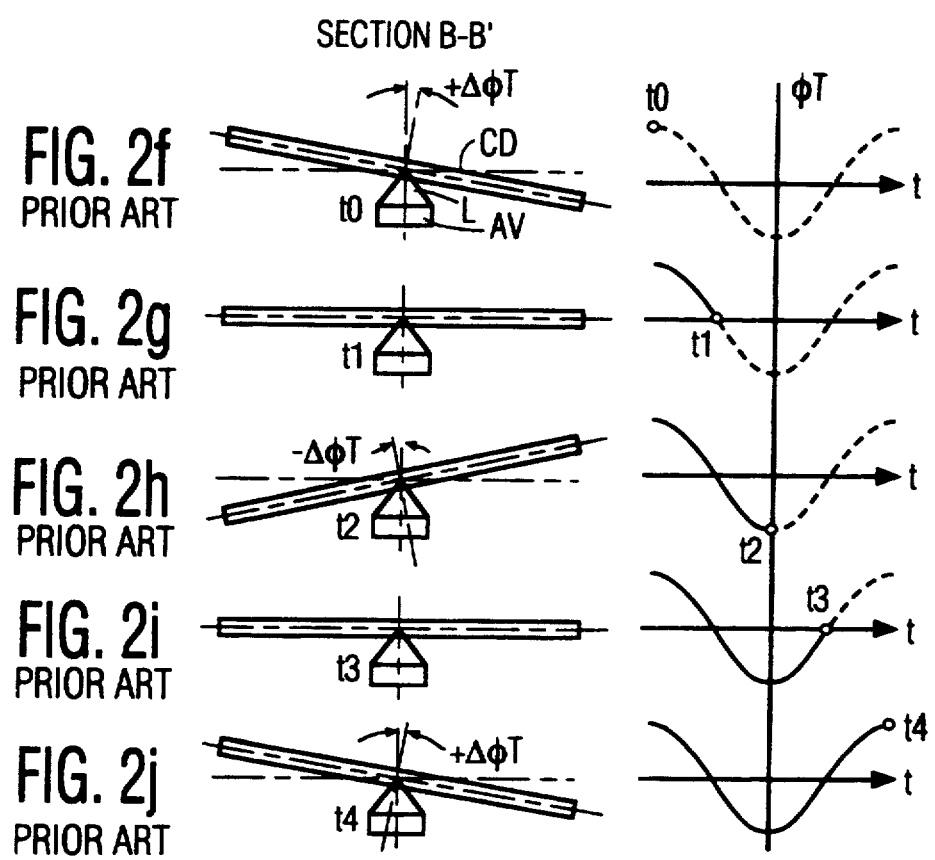

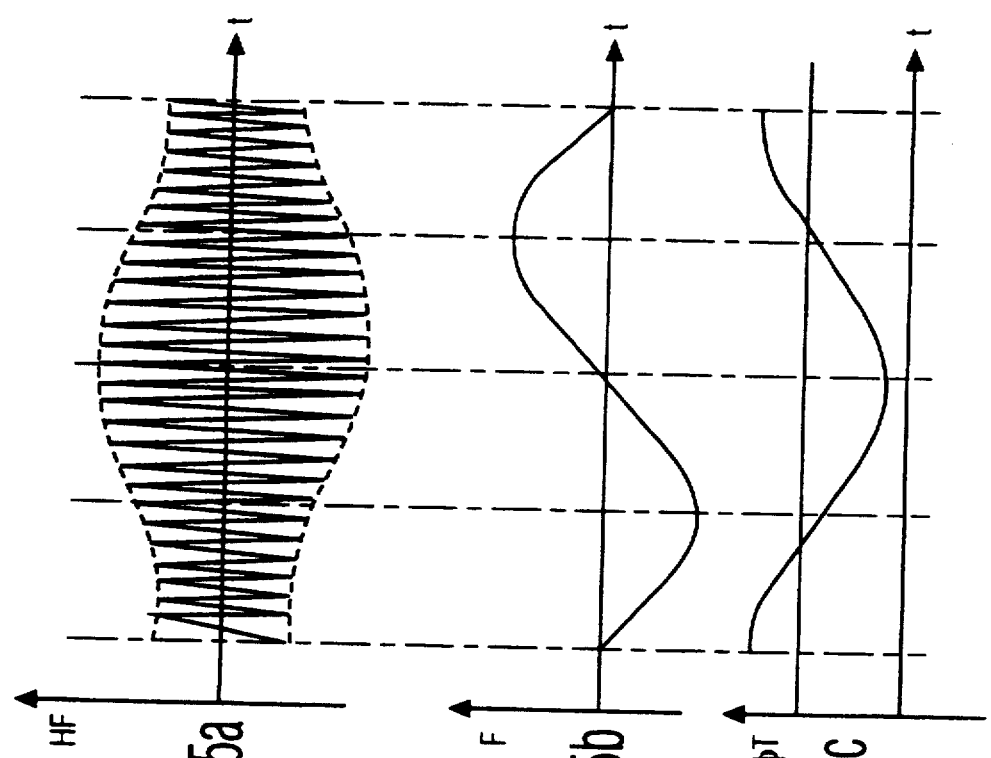
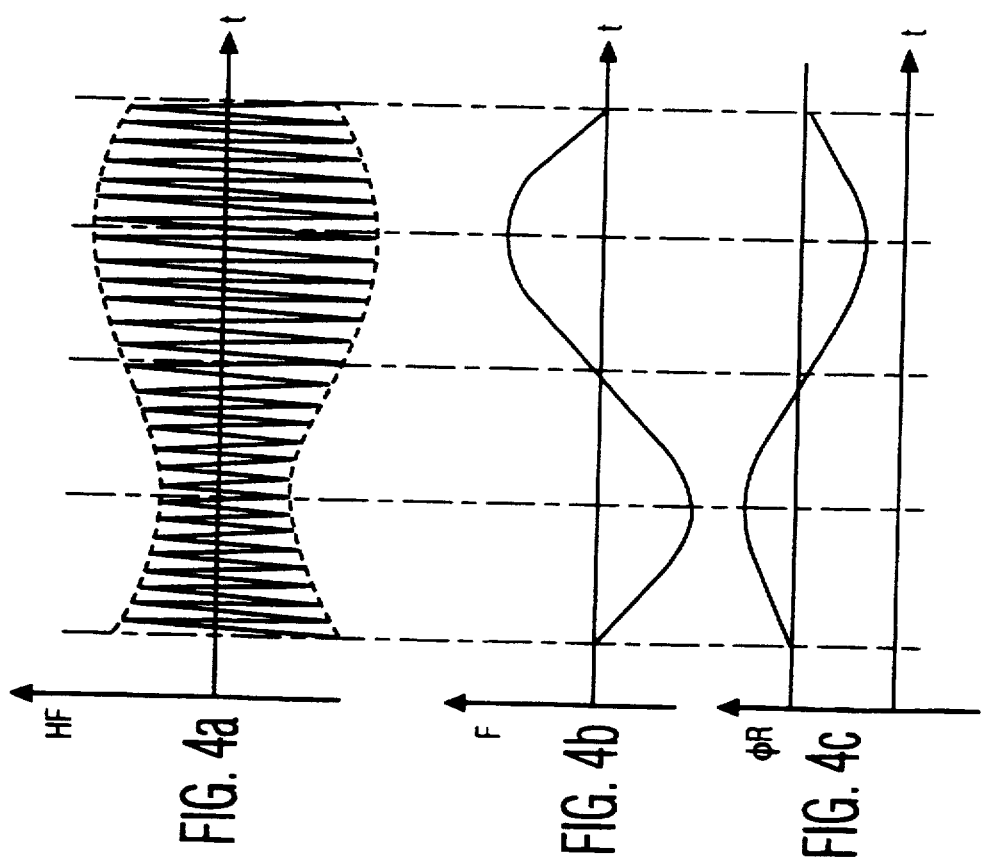

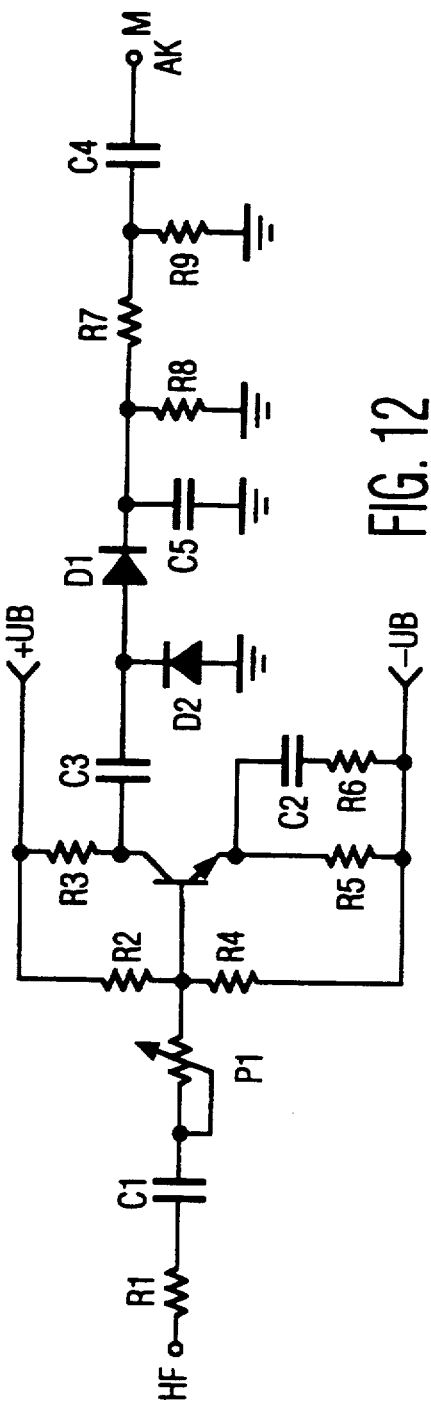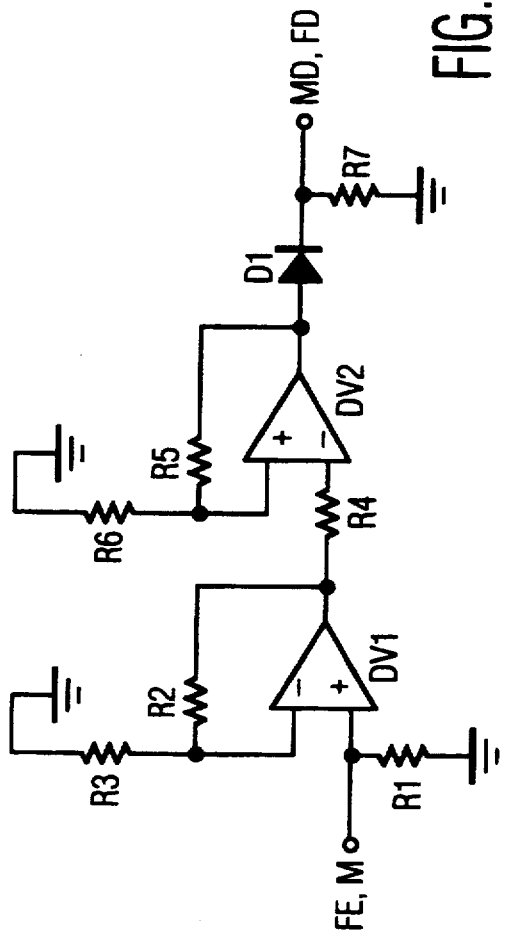

METHOD FOR MEASURING AND REGULATING THE RADIAL AND TANGENTIAL ANGLES OF A LIGHT BEAM

This is a continuation of PCT application PCT/EP 91/01699, filed Sep. 6, 1991 by Friedrich Fuldner, Hans-Robert Kuhn and Dieter Storz and titled "Process And Device For Adjusting Radial And Tangential Angles Of Light Beams.

The invention concerns a method for generating both a regulating or a measuring signal in order to measure or regulate, to a set value, the tangential angle and the radial angle of a light beam arranged for reading data on a rotating recording medium, whereby said light beam is reflected from the recording medium onto a photodetector the output signal of which represents the data signal.

For reading the data of an optical disk, for example, a so-called compact disk in a compact disk player or a magneto-optical disk, a light beam is focused, by means of a focusing control circuit, onto the disk which reflects said beam onto one or more photodiodes from whose output signals the electrical data signal is obtained. The light beam scanning the data is guided along the circular or spiral shaped data tracks of the disk by means of a tracking regulation circuit.

A known optical recording medium is, for example, the compact disk (CD), with which a light-reflective aluminum coating follows (covers) the light-permeable layer. The light-reflective aluminum coating exhibits depressions or raised parts, so-called pits, which represent the data stored on the compact disk. The data on the compact disk can be read by means of an optical scanning facility because the reflective behaviour of the light-reflective aluminum coating depends on the pattern formed by the depressions on the disk. Less light is reflected from a depression, also frequently called a groove, or from a raised part than from a region without depressions or raised parts, often designated as land.

Therefore, from the intensity of the light reflected from the compact disk the optical scanning facility detects whether the scanned bit is, for example, a logical one or a logical zero or a jump in amplitude which appears if the light beam scans the transition from a depression to a raised part or from a raised part to a depression.

In order to be able to scan the data on the disk the light beam should strike the surface of the disk as perpendicular as possible because deviations of ±1 degree lead to a sharp increase in the bit error rate. The angle formed by the tangenial plane of the light beam and the perpendicular is hereinafter designated the tangential angle, while the angle enclosed by the light beam in the radial plane normal to the tangential plane and the perpendicular will be expressed as the radial angle.

An optical scanning facility for an optical recording and/or playback device is known from EP-PA 0 070 070 whose objective lens, which focuses the light beam onto the disk, is seated in a cylinder-shaped objective mount. The cylinder-shaped objective mount is freely suspended in a magnetic field generated by several coils. The light beam from a light source is directed, with the help of a lens, onto the ridge of a ridge prism which is situated on the casing of the objective mount. Thereby, the light beam emitted from the light source is split into two light beams by the ridge prism. The first light beam reflected from the ridge prism is directed onto a first four-quadrant photodetector consisting of four photodiodes; a second four-quadrant photodetector also consisting of four photodiodes is located in the beam path of the other light beam reflected from the ridge prism. The regulating signals are generated from the, in total, eight output signals from the photodiodes of the two four-quadrant photodetector in order to regulate the position of the objective mount in the space with reference to a fixed system of coordinates.

The objective mount has six degrees of freedom of movement. It can be moved along the optical axis of the objective lens, designated the z-axis, along the y-axis which runs parallel to the tangent of the disk, and along the x-axis which runs like a radius to the center point of the disk. The x, y and z axes form a right-angled coordinate system. In addition to these three translation movements the objective mount can be rotated about the x, y and z axes.

This known optical scanning facility whose objective lens is freely suspended in a magnetic field and can move in all six degrees of freedom has, however, serious disadvantages.

A first disadvantage is found in the high expenditure because an additional light source, two extra four-quadrant photodetectors, one lens and a ridge prism are required for regulating the position of the objective lens.

A second disadvantage is that the additional light source, the two extra four-quadrant photodetectors, the objective lens in the objective mount, the ridge prism on the casing surface of the objective mount and the axis of the disk turntable on which the disk to be played rests, must be adjusted precisely to each other if the light beam is to radiate perpendicular onto the disk.

A third disadvantage is that the mass of the objective mount, freely suspended in the magnetic field, is increased by the mass of the ridge prism, and that an asymmetic distribution of the mass of the objective mount is caused by the ridge prism. As a freely-moving part, suspended in a magnetic field, the objective mount should, however, exhibit a mass as low as possible and a symmetric mass distribution.

However, probably the most serious disadvantage is that the actual angle at which the light beam strikes the disk is completely undetected. Rather, only the position of the optical axis of the objective lens is regulated with respect to a reference axis fixed in space. With the known facility, the axis of revolution of the disk turntable serves as the reference axis fixed in space.

If now, for example, the disk is afflicted by disk slap or chattering, then although the optical axis of the objective lens is fixed in space, the plane of the disk, however, alters its spatial position. Therefore, the tangential and the radial angles of the light beam are altered by disk slap or chattering; as this alteration in the tangential and radial angles caused by the disk slap or chattering is not detected, they also cannot be corrected.

If the disk is not even but has a curved or wavy surface, then the tangential and radial angles are constantly changing while the disk rotates. Further, these disturbing changes in the angles cannot be detected and thereby, not corrected.

Similarly, the tangential and radial angles cannot be corrected if the axis for the disk drive is not held firmly in place but executes processional motion.

SUMMARY OF THE INVENTION

It is, therefore, the object of the invention to specify a method which enables the tangential and radial angles of the light beam focused onto the disk to be measured without needing an additional measuring facility, without increasing the mass of the mount for the objective lens and without causing an asymmetric mass distribution.

The invention solves this task in that the data signal is demodulated in an amplitude demodulator and in that the regulating or meassuring signals are generated from the amplitude and the phase position of the demodulated data signal.

BRIEF DESCRIPTION OF THE DRAWINGS

FIGS. 2a–2j show the optical scanning of the disk-type recording medium with differing radial and tangential angles;

FIGS. 4a–4c show the data signal HF and the filtered focusing error signal F conditional upon the radial angle;

FIGS. 5a–5c show the data signal HF and the filtered focusing error signal F conditional upon the tangential angle;

FIG. 12 shows an embodiment example of an amplitude demodulator;

FIG. 13 shows an embodiment example of an impulse former;

DETAIL OF THE PREFERRED EMBODIMENTS

Figure 1:
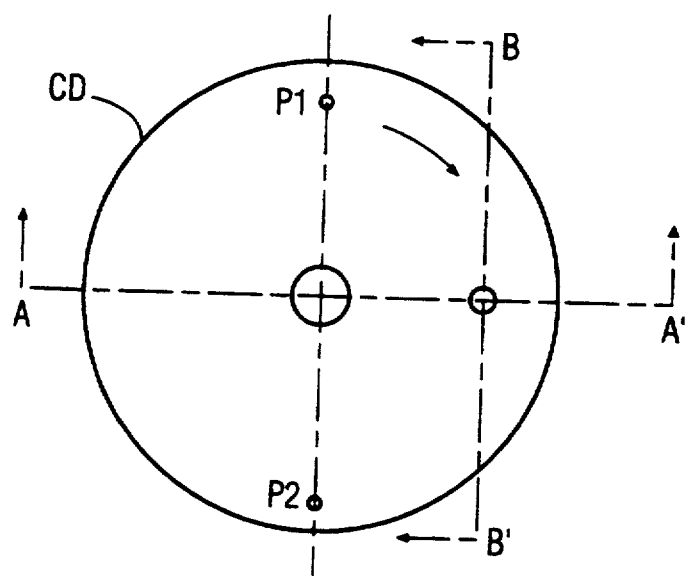
FIG. 1 shows a disk-type recording medium.

In order to be able to understand the invention more easily, it will first be explained, by means of FIGS. 1 and 2a through 2j, how the disk slap or chattering affects the radial and tangential angles. Shown in FIG. 1 is a disk CD, for example, the compact disk in a compact disk player. As a result of disk slap or chattering, the causes of which lie in the shape of the disk, the disk drive or, as is usually the case, both, point P1 on disk CD rotating in the direction shown by the arrow lies lower than point P2 for example.

The cross-sections A-A' and B-B' through the disk CD are illustrated in FIGS. 2a through 2j.

The data recorded on the disk is read by means of an optical scanning facility AV the objective lens O of which focuses a light beam L onto the disk CD.

In FIGS. 2a and 2f the point P1 lies above, as shown in FIG. 1, while point P2 lies below. The radial angle $\phi R$ is, therefore, zero and the tangential angle has the positive value $+\Delta\phi T$.

In FIGS. 2b and 2g the disk has rotated 90 degrees in the direction of the arrow. Point P1 is just being scanned by the light beam 1. The radial angle $\phi R$ now has the positive value $+\Delta\phi R$ while the tangential angle $\phi T$ is zero. After further rotation through 90 degrees, point P1 now lies below while point P2 lies above and the radial angle is again zero; as shown in FIGS. 2c and 2b, the tangential angle has the negative value $-\Delta\phi T$.

After a further rotation of 90 degrees, illustrated in FIGS. 2d and 2i, the light beam L radiates onto point P2. The radial angle is zero and the tangential angle takes on the positive value $+\Delta\phi T$.

The invention is now based on the knowledge that if the disk rotates, the radius angle $\phi T$ alters according to a sine function and the tangential angle $\phi T$ according to a cosine function but with a phase shift of 90 degrees or vice versa according to the choice of zero point.

As is customary with optical recording and playback devices, the light beam focused onto the disk is reflected from the disk onto one or more photodetectors. There are, for example, optical scanning facilities known which possess an optical grid in the path of the beam and said grid splits the light beam emitted from a laser into the main beam and the diffracted beams. The main beam and the diffracted beams are focused onto the disk by means of an objective lens. The main beam is reflected from the disk, through an astigmatic-functioning optical element, for example, a cylinder lens, and onto a four-quadrant photodetector consisting of four photodiodes. The data signal HF is generated from the summation signal of the four photodiodes. The output signals of two diagonally opposite photodiodes are added together. The two sums formed in this way are subtracted from each other in order to generate the focusing error signal FE which is the regulating signal for the focusing regulation circuit.

Figure 3:
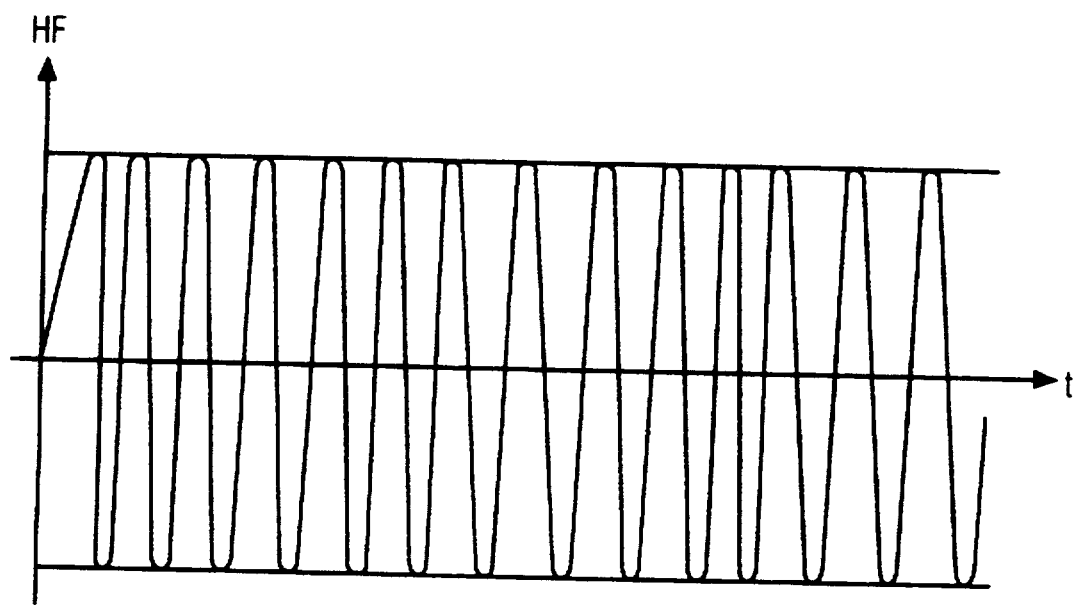
FIG. 3 shows the data signal HF with perpendicular incidence of the light beam on the recording medium.

In FIG. 3 the data signal HF is shown as if the light beam L strikes the disk CD perpendicular. The upper and lower enveloping curves for the data signal envelope HF are staight.

The invention is now based on the further knowledge that, as a result of different refraction or reflection, less light is reflected from the disk onto the four-quadrant photodetector if the light beam no longer radiates perpendicular onto the disk. As a consequence of this, the amplitude of the data signal HF is attenuated.

If the disk is now afflicted with disk slap or chattering, then the data signal HF is modulated using a sine function because of the sine-form alteration of the radial angle φR; as the tangential angle φT changes according to a cosine function, the data signal HF is also simultaneously modulated using a cosine function.

The amplitude-modulated data signal HF, conditional upon the radial angle φR, the radial angle φR and the sine-form focusing error signal FE are shown in FIGS. 4a, 4c and 4b respectively. The upper and lower envelope curves of the data signal HF are of sine-wave form.

The modulated data signal HF, conditional upon the tangential angle φT, the tangential angle φT and the filtered focusing error signal F are shown in FIGS. 5a, 5c and 5b respectively. The upper and lower envelope curves of the data signal HF are of cosine-wave form.

As the focusing error circuit must, as a result of disk slap or chattering, constantly re-adjust the position of the objective lens, the filtered focusing error signal F is also of sine-wave form. It has a fixed phase relationship to the disk slap or chattering. Owing to the fixed phase relationship to the disk slap or chattering, the filtered focusing error signal F is suitable as the reference signal to measure the phase shift of the amplitude-modulated data signal HF. The two modulation components $U1 = A^* \cos \alpha$ and $U2 = -B^* \sin \alpha$, originating from the radial angle φR and the tangential angle φT are superimposed because, as a result of disk slap or chattering, not only the radial angle φR but also the tangential angle φT alter. The resulting modulation voltage Uy results in $Uy = A^* \cos \alpha - B^* \sin \alpha = C^* \sin (\alpha + \phi)$. The point of inflection which coincides with the zero point can be calculated from the second differentiation $d^2Uy/d\alpha^2$.

$$d^2Uy/d\alpha^2 = -A^* \cos \alpha + B^* \sin \alpha = 0$$

$$tg\alpha = tg\phi = A/B$$

From which results the following:
A = C* sin φ
B = C* cos φ

The values of C and φ are determined by measurements. 'A' is the modulation component which originates from the alteration of the radial angle φR; B is the modulation component which effects the change in the tangential angle φT.

The arrangement shown in FIG. 6 for executing the method according to the invention will now be described and explained.

An optical scanning facility AV, the objective lens O of which focuses a light beam L onto a rotating disk CD by means of a focusing control circuit, transmits the data signal to an amplifier V. Apart from that, the optical scanning facility generates the actual (instantaneous) value IT for a tracking regulator TR and the actual value IF for the focusing regulator FR. The tracking regulator TR supplies a tracking error signal TE to the optical scanning facility AV in order to guide the light beam L along the data tracks of the disk CD. The focusing regulator FR generates a focusing error signal FE for the optical scanning facility AV in order to focus the light beam L onto the disk by means of the objective lens O.

Figure 6:
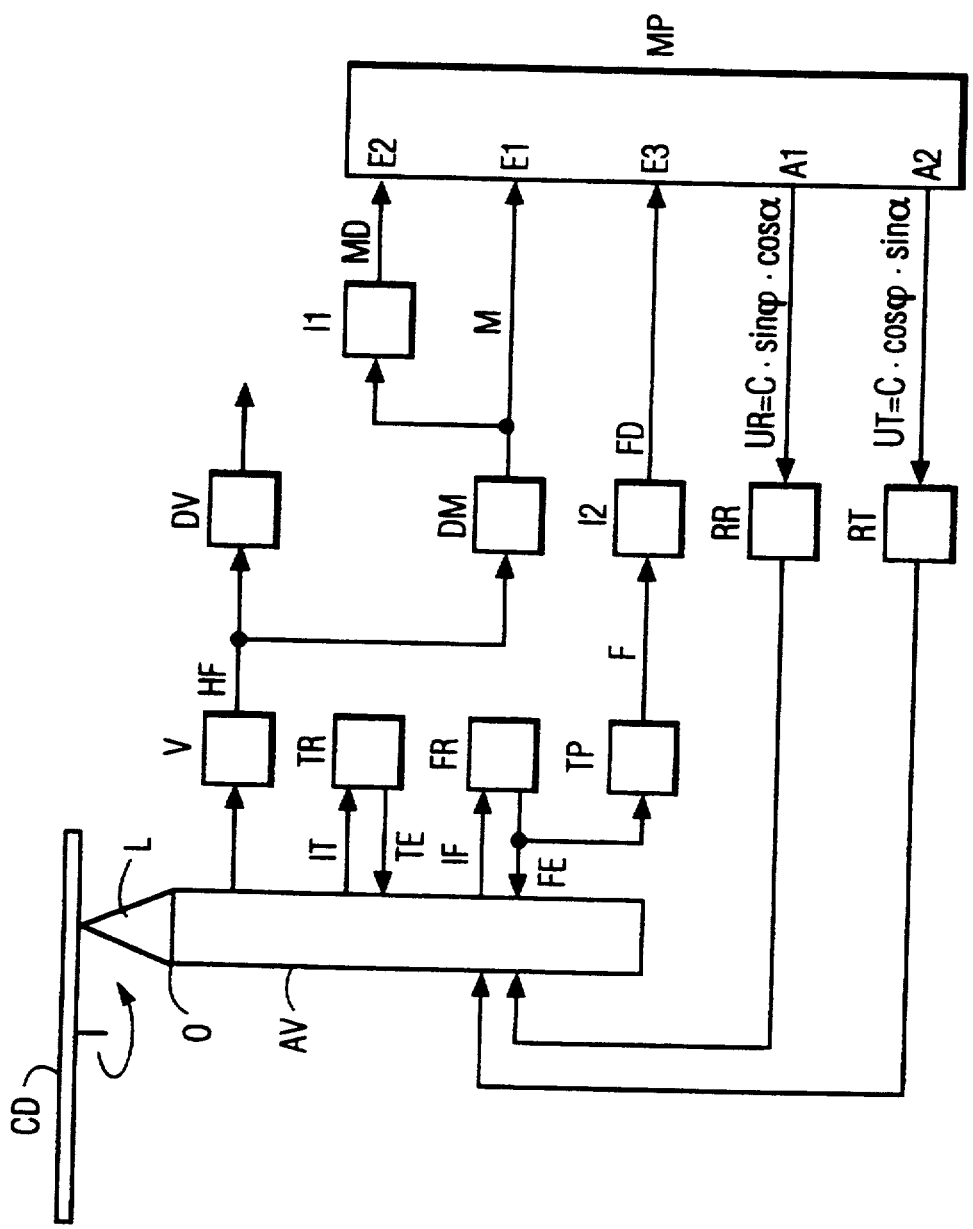
FIG. 6 show an arrangement for executing the invention-type method according to claim 5.

In order to fix the spatial position of the objective lens O and thus be able to adjust the radial angle φR and the tangential angle φT, servo components, for example, coils, are provided in the optical scanning facility AV; for simplicity, said components are, however, not illustrated in FIG. 6.

The amplifier V transmits the data signal HF to a data processing unit DV and an amplitude demodulator DM, the output of which is coupled with the first input E1 of a microprocessor MP and the input of a first impulse former I1. The output of the impulse former I1 is coupled with the second input E2 of the microprocessor MP. The focusing error signal FE generated by the focusing regulator FR is fed to the input of a low-pass filter TP, the output of which is coupled with the input of a second impulse former I2. The output of the second impulse former I2 is coupled with the third input E3 of the microprocessor MP. The first output A1 of the microprocessor MP is coupled with a regulator RR for regulating the radial angle φR, and the second output A2 is coupled with a regulator RT for regulating the tangential angle φT. The regulating signals from the two regulators RR and RT are fed to servo components in the optical scanning facility AV which adjust the spatial position of the objective lens O. However, the spatial position of the entire optical scanning facility or the disk drive axis can also be adjusted with the help of the regulating signals.

FIGS. 7a to 7f shows the amplitude-modulated data signal HF at the output of the pre-amplifier V, the focusing error signal FE, the filtered focusing error signal F at the output of the low-pass filter TP, the digitalized focusing error signal FD at the output of the second impulse former I2, the demodulated data signal M at the output of the amplitude demodulator DM and the digitalized demodulated data signal MD at the output of the first impulse former I1.

The high frequency (HF) oscillations of the data signal HF, filtered out by the low-pass filter TP, are superimposed on the sine-wave form focusing error signal FE. The impulse former I2 converts the filtered sine-wave form focusing error signal F into a signal with square-wave form, the digitalized focusing error signal FD. The impulse former I1 converts the demodulated sine-wave form data signal M into the demodulated data signal MD with square-wave form. The microprocessor calculates $M = C^* \sin (\alpha + \phi)$ from the demodulated data signal, the regulating signal $UR = C^* \sin \phi^* \cos \alpha$ in the manner already explained, and $UT = -C^* \cos \phi^* \sin \alpha$ for the regulators RR and RT.

Figure 8:
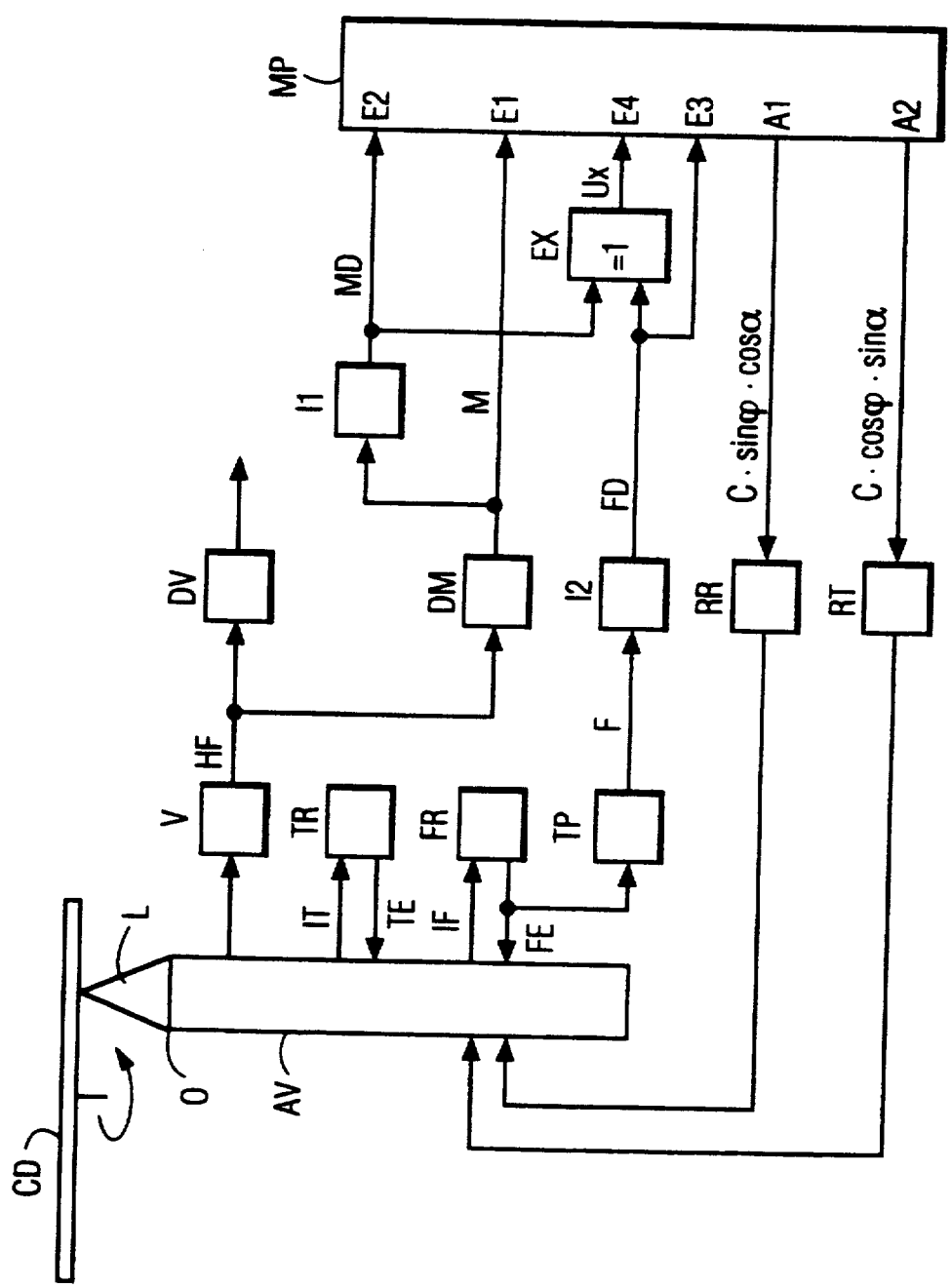
FIG. 8 shows an arrangement for executing the invention-type method according to claim 5 with a facility for the error correction.

In FIG. 8 the digitalized focusing error signal FD and the demodulated digitalized data signal MD are linked together in an exclusive-OR gate EX in order to generate a control voltage Ux. The exclusive-OR gate EX can also be integrated into the microprocessor MP.

Figure 7A:
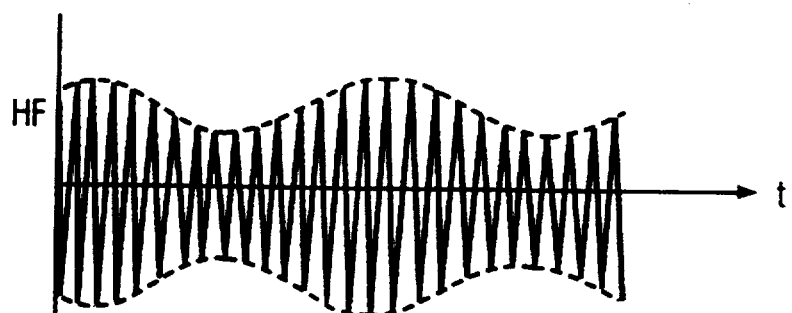
FIGS. 7a–7a show the data signal HF, the focusing error signal FE, the filtered focusing error signal F, the demodulated data signal M, the digitalized focusing error signal FD, the digitalized demodulated data signal MD and a control voltage Ux.
Figure 7B:
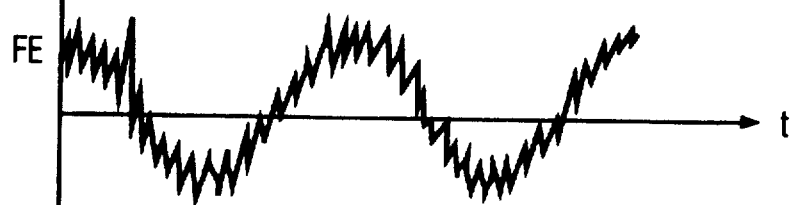
Figure 7C:
Figure 7D:
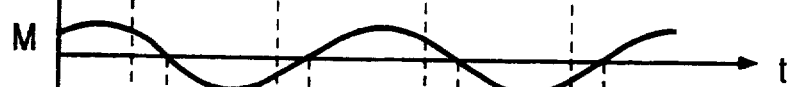
Figure 7E:
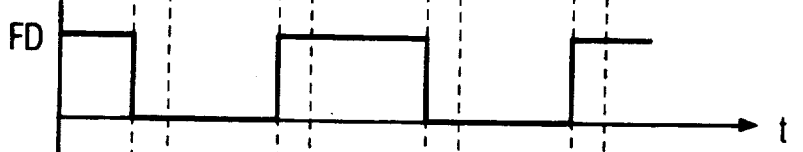
Figure 7F:
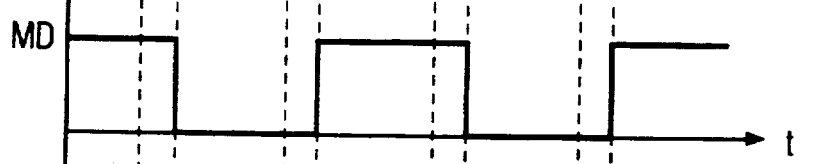
Figure 7G:
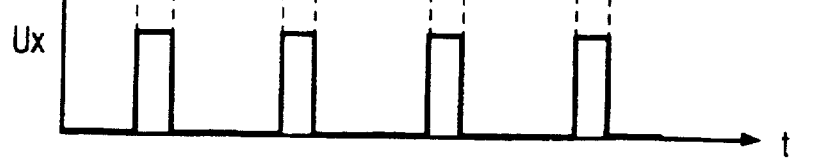

Besides the signals FD and MD, Ux is also shown in FIG. 7g.

Figure 9A:
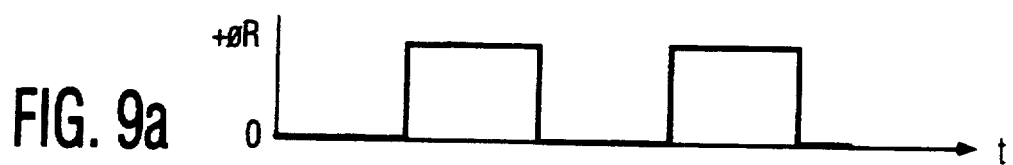
FIGS. 9a–9i show the control voltage Ux conditional upon differing radial and tangential angles.
Figure 9B:
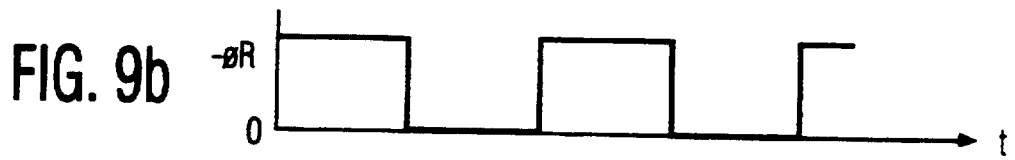
Figure 9C:
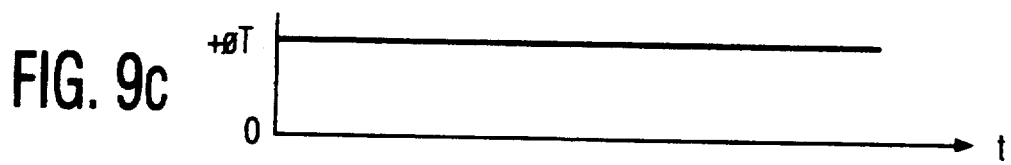
Figure 9D:
Figure 9E:
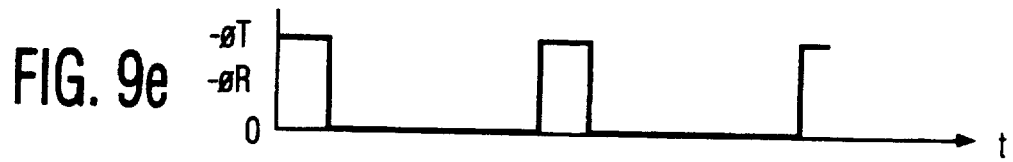
Figure 9F:
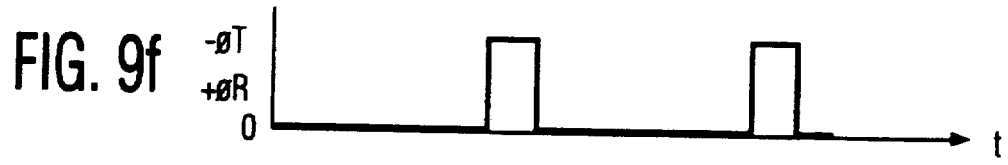
Figure 9G:
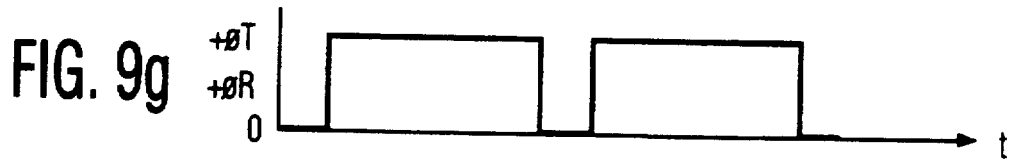
Figure 9H:
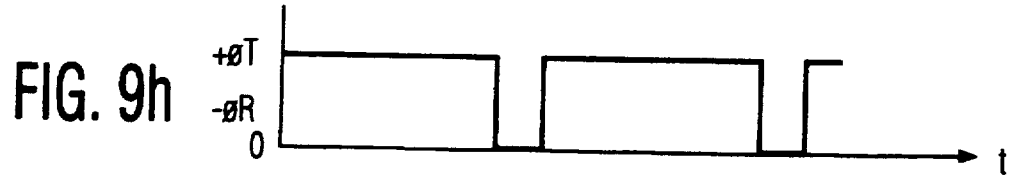
Figure 9I:
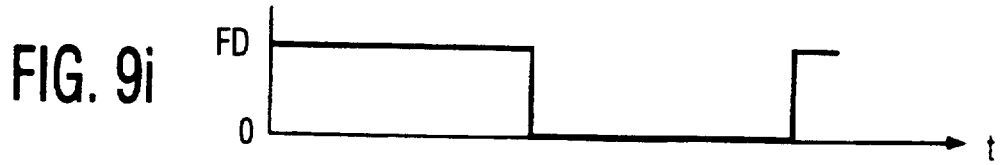

FIGS. 9a through 9h illustrate the control voltage Ux for different radial angles φR and tangential angles φT. FIG. 9i shows the digitalized focusing error signal FD.

Figure 10D:
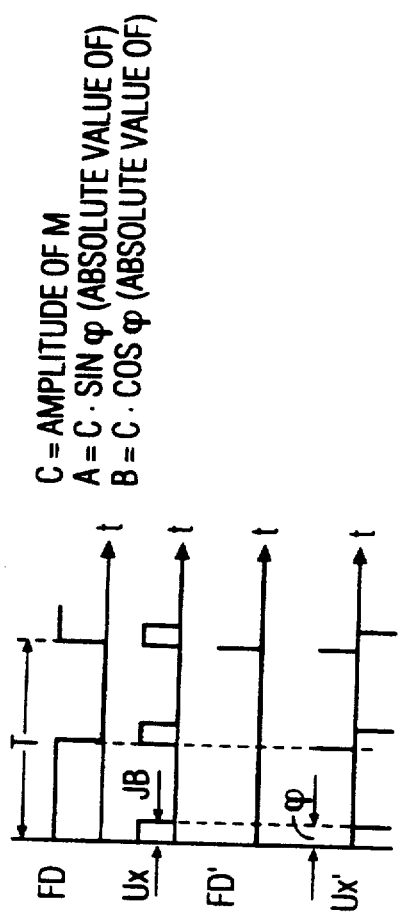
FIG. 10d is a waveform diagram useful in showing the relationship between signals FD and Ux of FIG. 8.
Figure 10A:
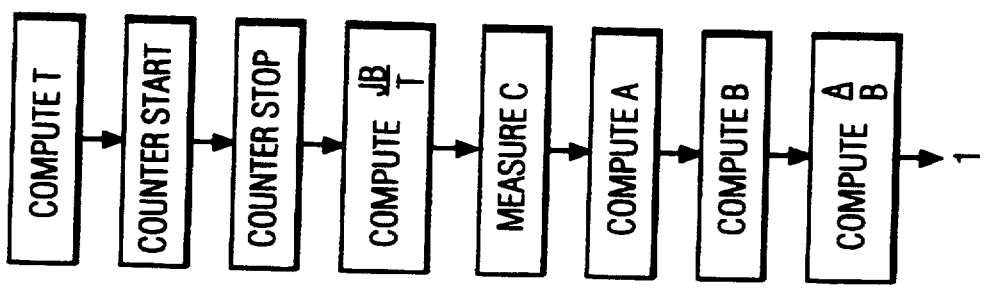
FIGS. 10a, 10b and 10c show a flow diagram for determining the value and sign of the radial and tangential angles
Figure 10B:
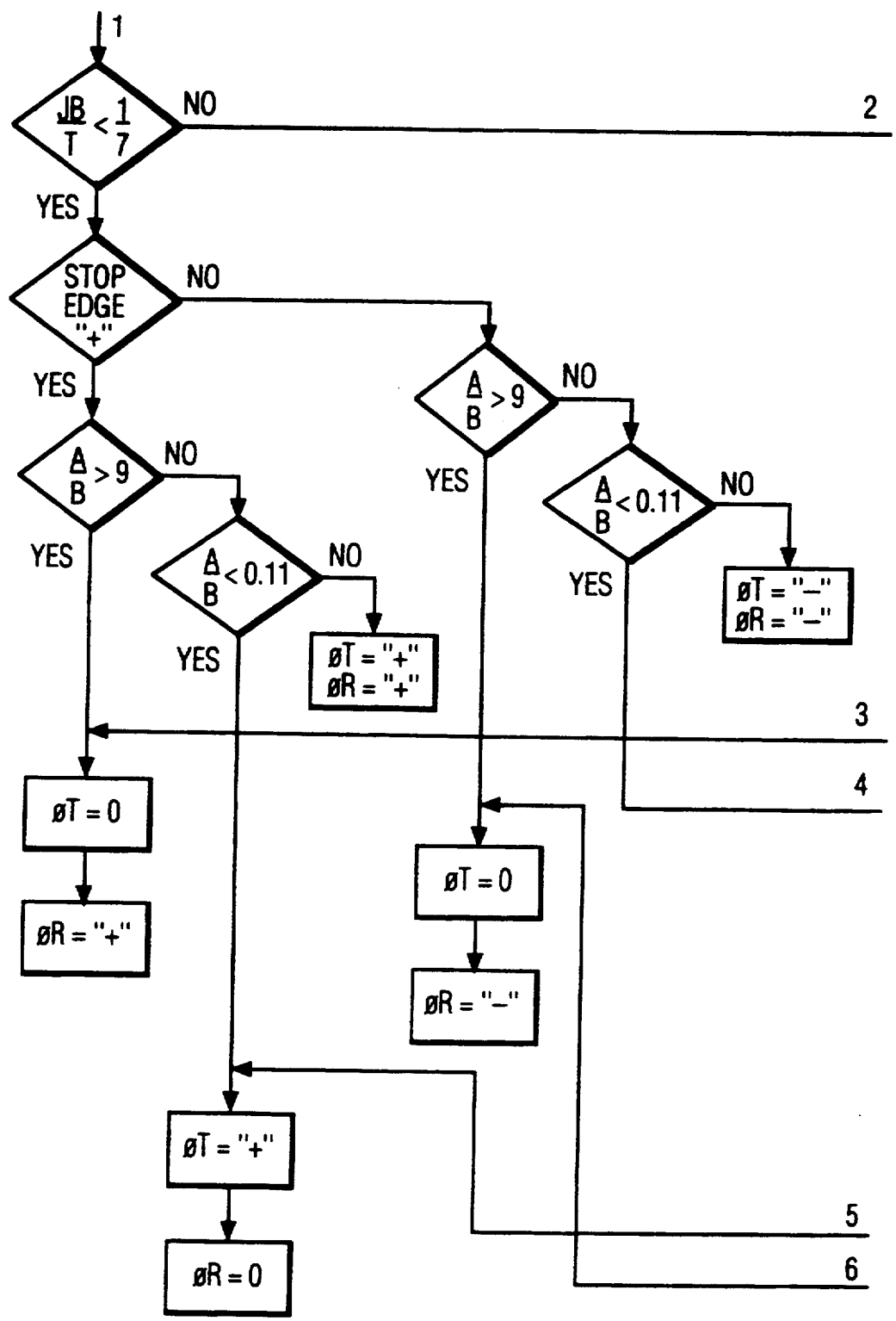
Figure 10C:
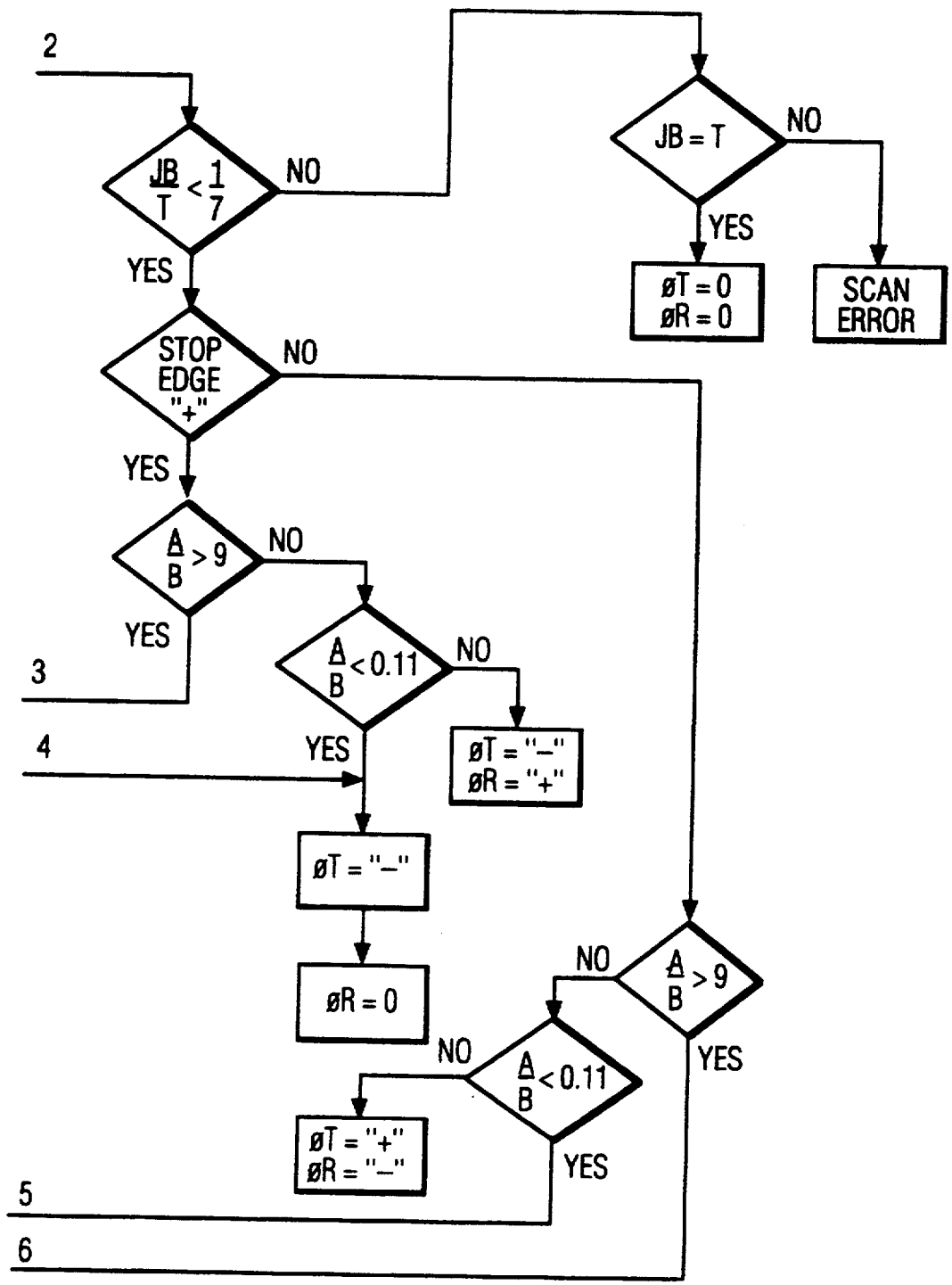

With the help of the flow diagram illustrated in FIGS. 10a, 10b and 10c, and the waveforms of FIG. 10d, it will now be explained how, for example, the radial angle φR and the tangential angle φT can be calculated according to value and sign.

Firstly, the periods T of the digitalized focusing error signal FD and the pulse width IB of the control signal Ux at the output of the exclusive-OR gate EX are measured by means of two counters in order to calculate the value IB/T. Both counters are started by the ascending flank in the digitalized focusing error signal FD. Apart from that, the amplitude C of the demodulated data signal M is measured in order to calculate $A = C^* \sin \phi$ and $B = C^* \cos \phi$ as well as A/B. Following that it is inquired whether IB/T falls in the interval from 0 through ¼, in the interval from ¼ through ½ or in the interval from ½ through 1. If IB/T falls in the interval ½ through 1 and IB=T, then the radial angle $\phi$R and the tangential angle $\phi$T are zero. The light beam is directed exactly perpendicular onto the disk. However, if IB does not equal T, then a faulty scan is taken.

If, on the other hand, IB/T<¼, then it is inquired whether the flank in the control signal Ux, which stops the second counter, was a descending or an ascending flank. After decisions have been made in both cases it is subsequently checked whether A/B>9. If A/B>9, then the sign of the radial angle $\phi$R and the tangential angle $\phi$T is known.

If A/B≦9, then it is inquired whether A/B<0.11. After this final inquiry the sign of the radial angle $\phi$R and the tangential angle $\phi$T can be determined. The exact form of inquiry for all cases which appear can be found in the flow diagram in FIGS. 10b and 10c.

The values 9 and 0.11 have proved to be favorable in trials. The relationship $tg\phi = A/B = 9$ corresponding to a phase shift of approximately 84 degrees, and the relationship $tg\phi = A/B = 0.11$ corresponding to a phase shift of about 6.3 degrees form the basis for this.

Using the numbers chosen for the example in the flow diagram the radial angle $\phi$R is taken as zero with a phase shift between 84 and 90 degrees. If the phase shift lies between 0 and 6.3 degrees, then the value 0 degrees is taken for the tangential angle $\phi$T.

Figure 11A:
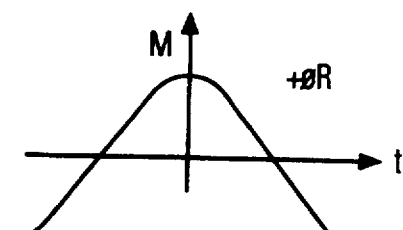
FIGS. 11a–11i show the demodulated data signal M, the demodulated digitalized data signal MD conditional upon differing radial and tangential angles as well as the focusing error signal FE and the digitalized focusing error signal FD.
Figure 11B:
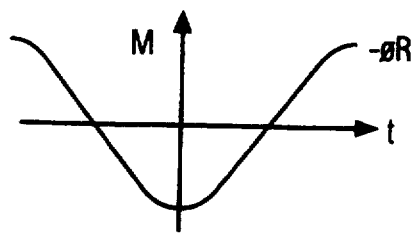
Figure 11C:
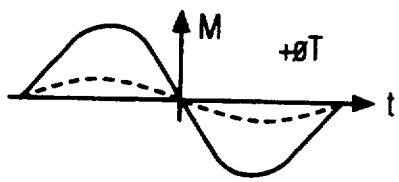
Figure 11D:
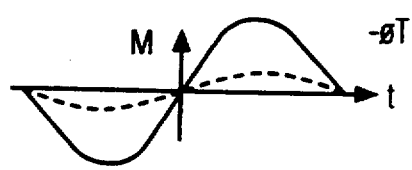
Figure 11E:
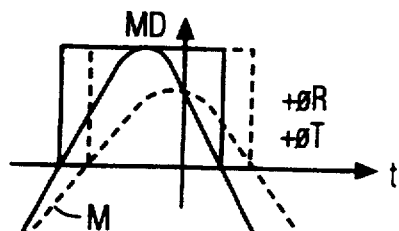
Figure 11F:
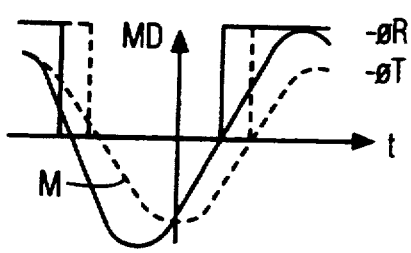
Figure 11G:
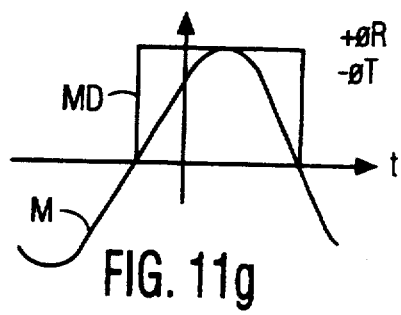
Figure 11H:
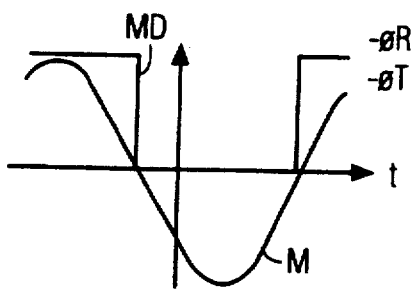
Figure 11I:
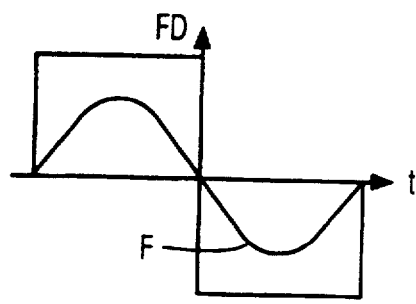

FIGS. 11a through 11h show the demodulated data signal M at the output of the demodulator DM and the digitalized data signal MD at the output of the impulse former I1 for various radial angles $\phi$R and tangential angles $\phi$T. FIG. 11i illustrates the focusing error signal FE and the digitalized focusing error FD at the output of the impulse former I2.

Figure 16:
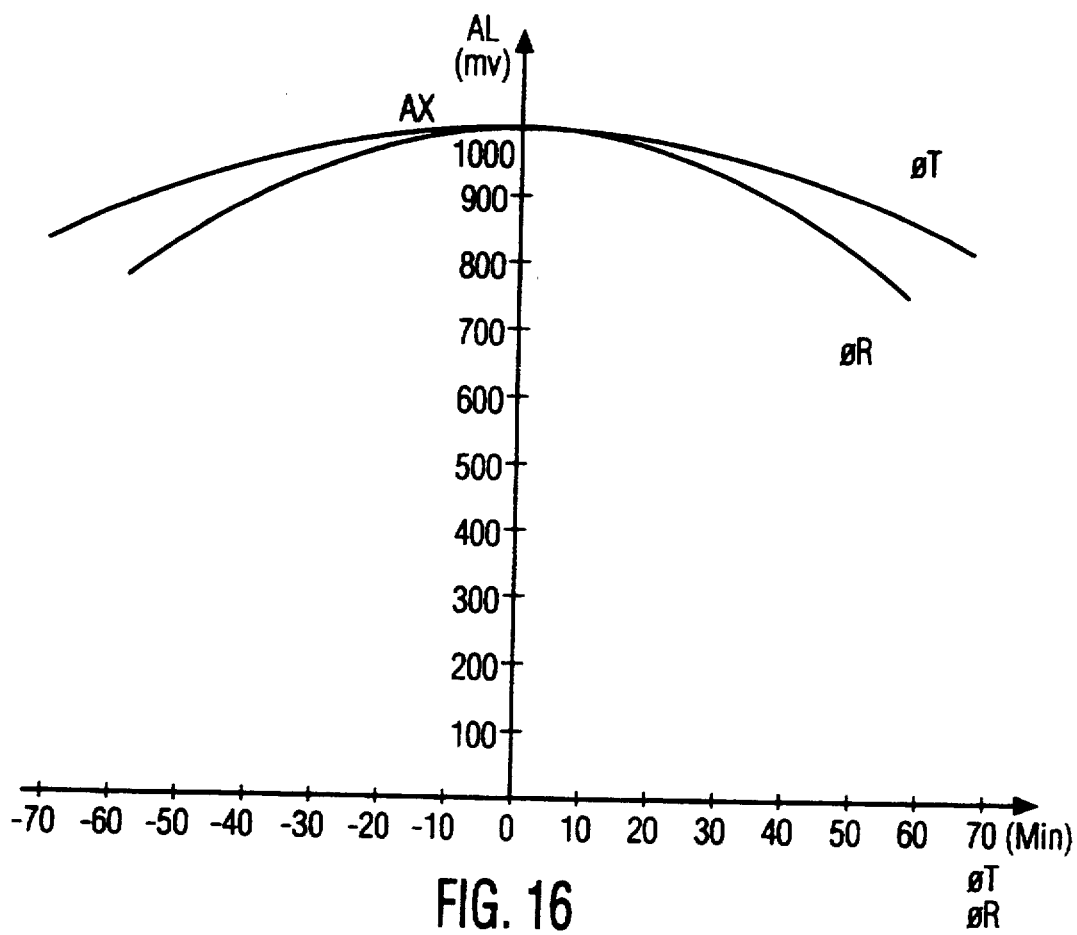
FIG. 16 shows the amplitude of the amplitude-modulated data signal HF conditional upon the radial angle $\phi R$ and the tangential angle $\phi T$.

The amplitude of the amplitude-modulated data signal is shown in mV in FIG. 16 conditional upon the radial angle $\phi$R and the tangential angle $\phi$T. As a result of asymmetry in the optics, for example, non-circular light spots on the recording medium or an asymmetric distribution of the light beam on the data track, a radial angle causes a different attenuation of the amplitude of the data signal than a tangential angle of the same size. In order to take this difference into account, a constant KR for the radial angle and a constant KT for the tangential angle are determined by means of the measuring curve shown in FIG. 16. The amplitude AL of the data signal HF equates to $AL = AX - KR^* \phi R^2$ for $\phi T = 0$, and $AL = AX - KT^* \phi T^2$ for $\phi R = 0$. AX is the maximum amplitude of the data signal HF.

Figure 17:
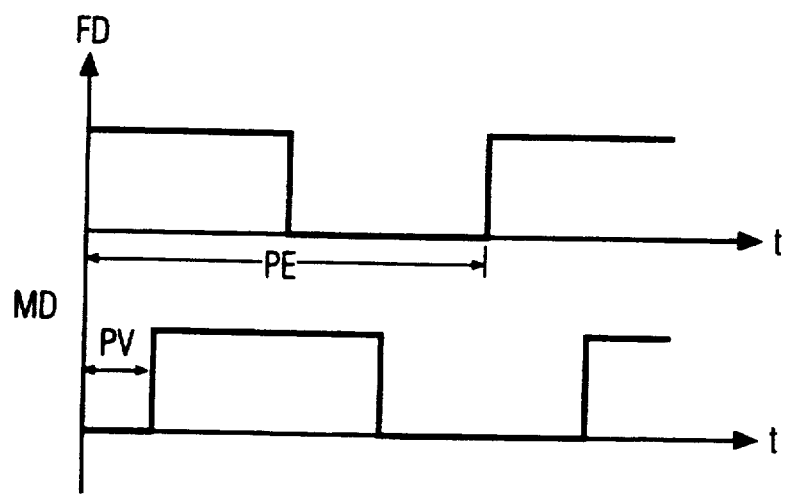
FIG. 17 shows the digital focusing error signal FD and the demodulated data signal MD.

The digitalized focusing error signal FD and the demodulated data signal MD are drawn superimposed on each other in FIG. 17 in order to be able to recognize the phase shift PV between the signals FD and MD.

Figure 18:
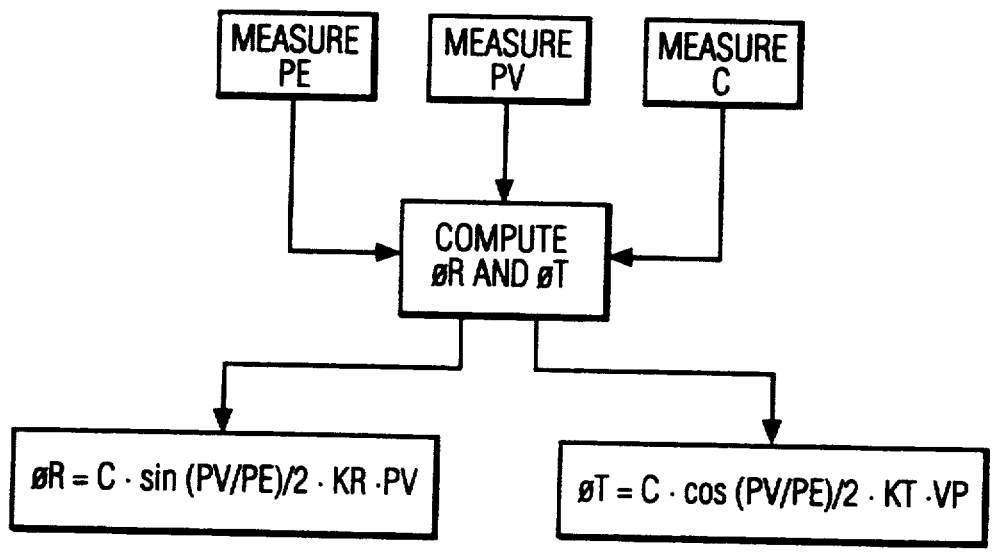
FIG. 18 shows a flow diagram for calculating the radial angle $\phi R$ and the tangential angle $\phi T$.

The flow diagram shown in FIG. 18 for calculating the radial angle $\phi$R and the tangential angle $\phi$T will now be explained.

Firstly, the phase shift PV between the digitalized focusing error signal FD and the demodulated data signal MD, the period PE of the digitalized focusing error signal FD and the amplitude C of the amplitude-modulated data signal are measured. The radial angle $\phi$R is calculated according to the following formula:

$$\phi R = C^* \sin (PV/PE)/2 * KR * VP.$$

The tangential angle $\phi$T is calculated according to the formula:

$$\phi T = C^* \cos (PV/PE)/2 * KT * VP.$$

VP is the vertical disk slap or chattering of the recording medium.

An embodiment example of an amplitude demodulator DM is illustrated in FIG. 12.

The data signal HF travels via a series connection consisting of a resistor R1, a capacitor C1 and a potentiometer P1 to the base of a transistor T1. A supply voltage +UB is applied to the base of transistor T1 via a resistor R2 and to the collector via a resistor R3. A supply voltage −UB is applied to the base of transistor T1 via a resistor R4 and to the emitter via a resistor R5 parallel to which is wired a series connection consisting of a capacitor C2 and a resistor R6. The collector of transistor T1 is coupled, via a series connection consisting of a capacitor C3 and a diode D1, a resistor R7 and a capacitor C4, with the output terminal AK of the amplitude demodulator DM. The coupling point of capacitor C3 and diode D1 is connected to reference potential via a diode D2. The coupling point of diode D1 and resistor R7 is connected to reference potential D1 via a parallel connection consisting of a resistor R8 and a capacitor C5. The coupling point of resistor R7 and capacitor C4 is connected to reference potential via a resistor R9.

An example of an impulse former I1 and I2 is shown in FIG. 13.

The demodulated data signal M or the focusing error signal FE is fed to the non-inverted input of a differential amplifier DV1 which is connected to reference potential via a resistor R1. The output of the differential amplifier DV1 is fed back via a resistor R2 to its inverted input which is connected to reference potential via a resistor R3. The output of the differential amplifier DV1 is coupled via a resistor R4 with the inverted input of a differential amplifier DV2, the output of which is coupled with the non-inverted input of the differential amplifier DV2 via a resistor R5. The non-inverted input of the differential amplifier DV2 is connected to reference potential via a resistor R6. The output of the differential amplifier DV2 is connected to reference potential via a series connection consisting of a diode D1 and a resistor R7. The demodulated digitalized data signal MD or the digitalized focusing error signal FD can be picked up at the coupling point of diode D1 and resistor R7.

The invention is suitable for optical and magneto-optical recording and playback devices. The method according to the invention ensures that the light beam for scanning the data strikes the disk perpendicular.

One advantage of the invention can be seen in that the sizes of the radial angle $\phi$R and the tangential angle $\phi$T can also be indicated. It is possible, therefore, to measure the quality of disks using a precisely adjusted optical scanning facility and an equally precisely adjusted disk drive. For this, the optical scanning facility and the disk drive are so adjusted that the light beam radiates perpendicular onto a test disk having a completely even surface and no disk slap or chattering.

If the disk to be tested is an ideal disk, then the value zero is indicated for the radial angle and the tangential angle upon scanning this disk. However, if the disk is curved or wavy, then values differing from zero are indicated for the radial and tangential angles. The measured radial and tangential angles are, therefore, a measure of the quality of the disk.

Figure 14:
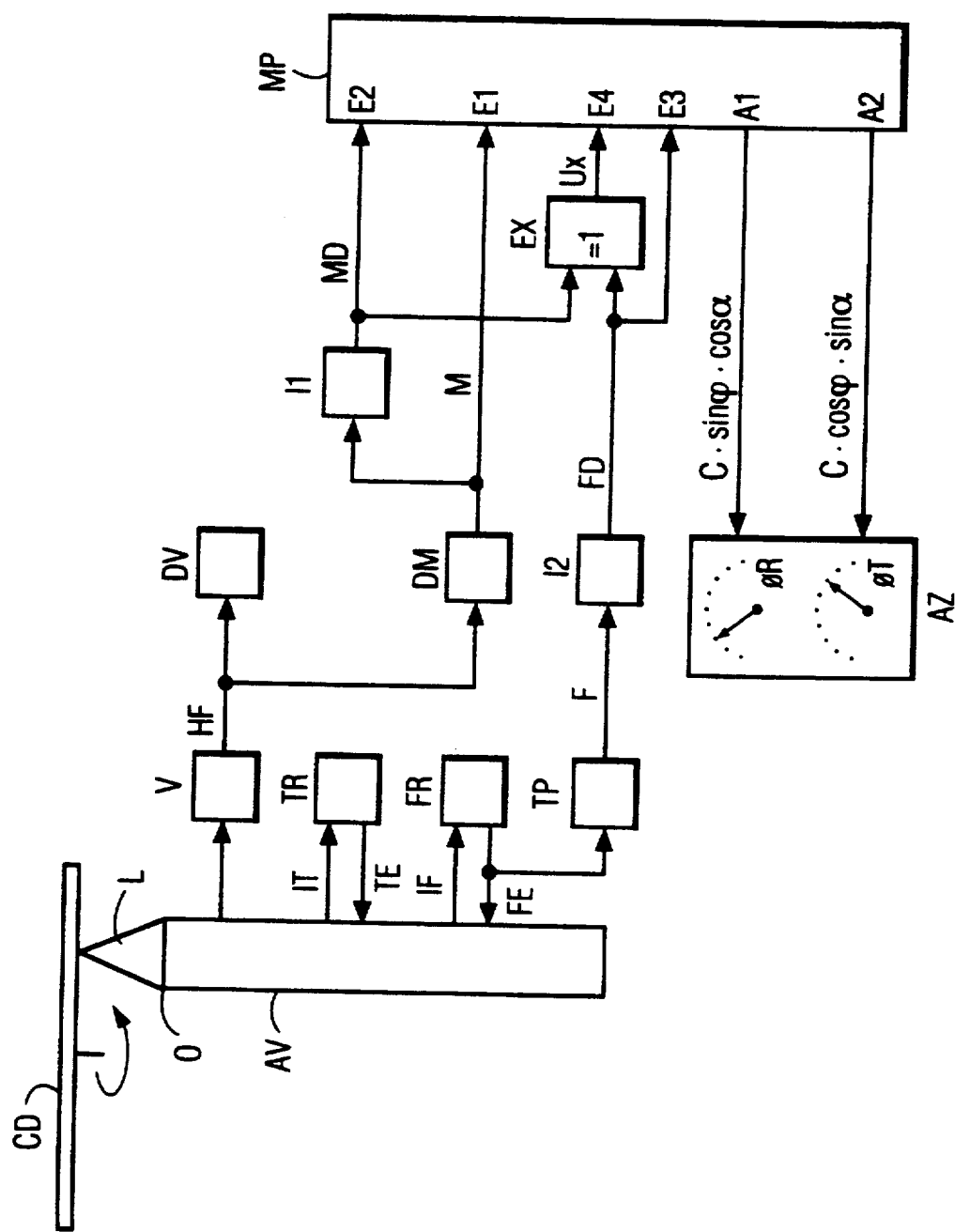
FIG. 14 shows an arrangement for measuring the radial and tangential angles of a disk-type recording medium.

A facility for measuring and indicating the radial angle $\phi R$ and the tangential angle $\phi T$ is illustrated in FIG. 14. This facility is distinguished from the arrangement shown in FIG. 8 because the signals at the outputs A1 and A2 of the microprocessor MP are fed to a display device AZ instead of two regulators.

Therefore, the invention also enables the construction of a measuring device for establishing the quality of optical and magneto-optical disks.

And vice versa; the tangential and radial angles of recording and playback devices can be measured using a measuring disk, the disk slap or chattering on which is known.

Figure 15:
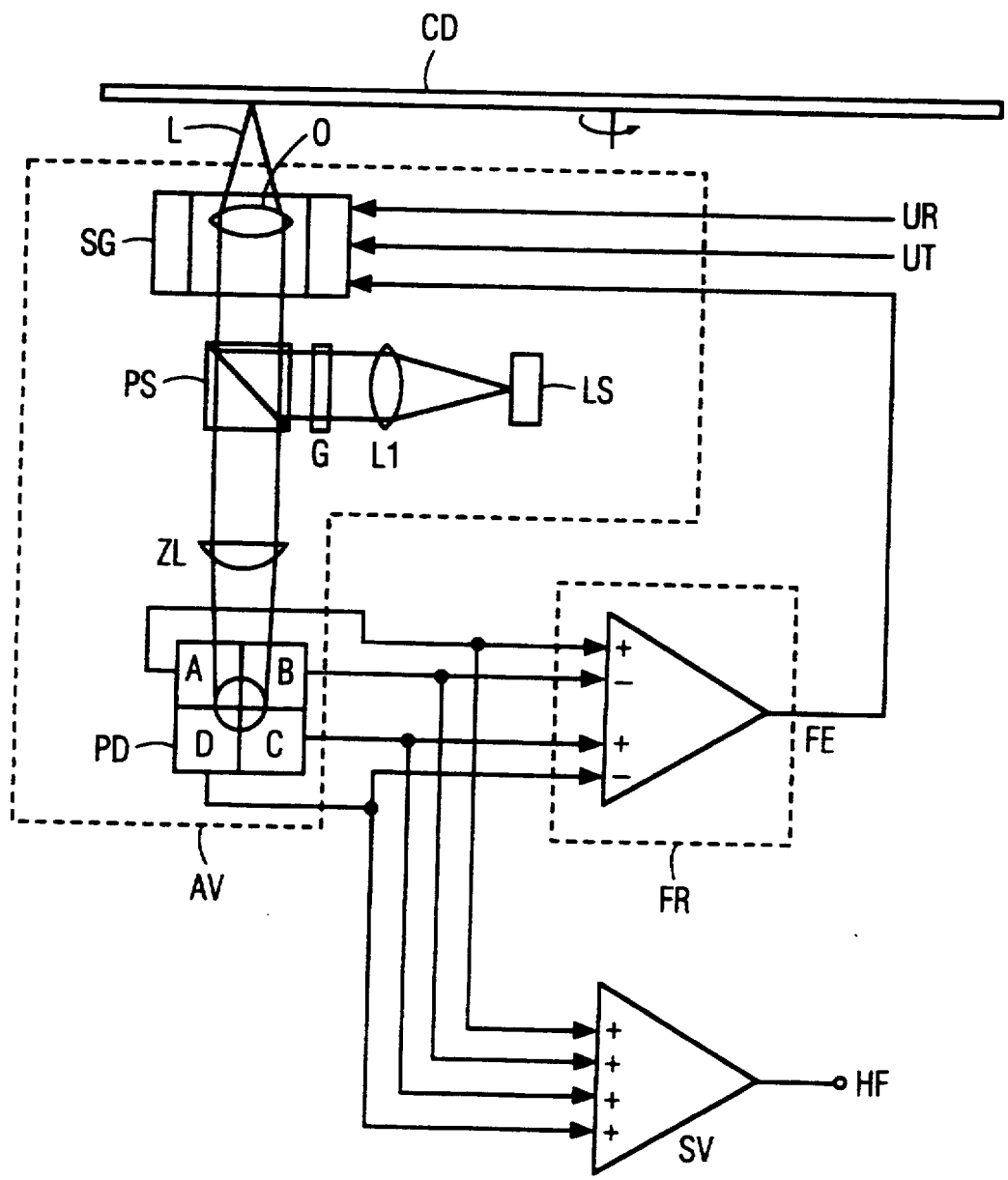
FIG. 15 shows the construction of an optical scanning facility for reading the data of the disk-type recording medium.

The construction of an optical scanning facility is illustrated in FIG. 15.

The light beam from a laser LS radiates through a lens L1 onto a prism beam splitter PS which deflects the light beam at right-angles to the objective lens O which focuses it onto the disk CD with the help of the focus regulation circuit. The light beam is reflected from the disk CD back to the prism beam splitter PS. The reflected light beam radiates in a straight line through the prism beam splitter PS to a cylinder lens ZL which directs it onto a four-quadrant photodetector PD with four photodiodes A, B, C and D. The output signals from the four photodiodes A, B, C and D of the four-quadrant photodetector PD are added in an additive amplifier SV. The data signal HF can be picked up at the output of the additive amplifier SV. In a differential amplifier, the focusing regulator FR, the focusing error signal FE is generated by adding the output signals from the two diagonally opposite photodiodes A and C, and by subtracting the output signals from the other two diagonally opposite photodiodes B and D. The output of the focusing regulator FR is coupled with the servo components SG of the objective lens O. The regulating signals UR and UT are also fed to the servo components SG which, for example, can be several coils. By means of the magnetic fields generated by the coils, the objective lens can be moved not only along the optical axis—the z-axis—, in order to focus the light beam onto the disk CD, but also rotate about the x and y axes in order to adjust the tangential and radial angles.

We claim:

1. In a rotating disc data recovery apparatus, an improved method for generating a regulating signal to control at least one of a tangential angle (fT) and a radial angle (fR) of a substantially constant intensity light beam directed onto said rotating disc for reading the data on said disc, whereby the light beam is reflected from said rotating disc onto a photodetector from which an output signal representing a data signal is derived, and wherein the average intensity of said reflected light beam is modulated by light beam tracking errors and excursions of the disc in the direction of the optical axis of said light beam, said improved method comprising:

amplitude demodulating the output signal representing said data signal to generate a demodulated signal M;

generating said regulating signal from amplitude and phase components of the demodulated signal M.

2. The method set forth in claim 1, wherein the demodulated signal M is of the form $M = C \sin(a+y)$ and the regulating signal is of the form $UR = C \sin(y) \cos(a)$ for the radial angle (fR) and $UT = C \cos(y) \sin(a)$ for the tangential angle (fT), where C is the amplitude of the demodulated signal, a is a frequency equal to a multiple, including 1, of the rotation frequency of the rotating disc, and y is a phase angle arising from the radial and tangential angles respectively.

3. The method according to claims 2 wherein said rotating disc data recovery apparatus includes first and second regulators for adjusting the radial and tangential angles of the light beam respectively, said method further including:

applying the regulating signal UR to said first regulator (RR) which regulates the radial angle (fR) of the light beam (L); and applying the regulating signal UT to said second regulator (RT) which regulates the tangential angle (fT) of the light beam (L).

4. Arrangement for executing the method according to claim 2 characterized in that the light beam (L) of an optical scanning facility (AV) is focused onto the rotating disc (CD) by means of an objective lens (O), the optical scanning facility (AV) feeds the data signal to an amplifier (V), the output of which is coupled with an input of a data processing unit (DV) and with an input of an amplitude demodulator (DM), the output of the amplitude demodulator (DM) is coupled with a first input (E1) of a microprocessor (MP) and with an input of a first impulse former (I1), the output of first impulse former (I1) is coupled with a second input (E2) of the microprocessor (MP), the optical scanning facility (AV) provides a focusing regulator (FR) with the actual (instantaneous) value (IF) of the focusing regulation circuit and said regulator generates a focusing error signal (FE) and transmits said signal (FE) to the optical scanning facility (AV) and a low-pass filter (TP), the output of which is coupled with an input of a second impulse former (I2), the output of the second impulse former (I2) is coupled with a third input (E3) of the microprocessor (MP), a first output (A1) of the microprocessor (MP), which provides the regulating signal $UR = C \sin y \cos a$, is coupled with the input of a first regulator (RR), the output of which is coupled with the optical scanning facility (AV), and that a second output (A2) of the microprocessor (MP), which provides the regulating signal $UT = C \cos y \sin a$, is coupled with the input of a second regulator (RT), the output of which is coupled with the optical scanning facility (AV).

5. Arrangement according to claim 4 characterized in that the outputs of the first impulse former (I1) and the second impulse former (I2) are coupled with respective inputs of an exclusive-OR gate (EX), the output of which is coupled with a fourth input (E4) of the microprocessor (MP).

6. The method according to claim 1, further comprising:

generating a focus error signal from said reflected light;

comparing the phase of the focus error signal with the phase of the demodulated signal M;

using the results of the phase comparison to generate the regulating signal.

7. The method according to claim 6, characterized in that the radial angle (fR) is calculated according to the formula $fR = C \sin(PV/PE)/(2KR(VP))$, and the tangential angle (fT) is calculated according to the formula $fT = C \cos(PV/PE)/2KT(VP)$, where KR and KT are predetermined constants. VP is the vertical disk slap or chattering of the recording medium, PE is the period of the focus error signal, and PV is the phase delay of the demodulated signal M relative to the focus error signal.

8. The method according to claim 6 further including:
providing a display device (AZ) for displaying information;
applying the regulating signal UR and the regulating signal UT to said display device (AZ) to indicate the radial angle (fR) and the tangential angle (fT).

9. Apparatus in a rotating disc data recovery system for generating signals to regulate the radial and tangential angles of a light beam focused on said disc, said apparatus comprising:
a light source including means for focusing light on said rotating disc;
a photodetector for detecting light reflected from said disc, said photodetector providing a plurality of detection signals;
a summer for adding predetermined ones of said plurality of detection signals to generate a data signal representing recorded data, said data signal exhibiting amplitude modulation (AM) resulting from deviations in the interaction said means for focusing light on said disc and which is distinguishable from amplitude modulation produced by recorded data;
a demodulator for detecting said amplitude modulation (AM);
a regulator, responsive to a control signal, and coupled to said light source including means for focusing light on said rotating disc, for controlling at least one of the radial and tangential angles at which said light is incident on said disc; and
means responsive to detected said amplitude modulation (AM) for generating said control signal, and applying said control signal to said regulator.

10. The apparatus set forth in claim 9 further including;
a differential summer, responsive to predetermined ones of said plurality of detection signals for generating a focus error signal; and
wherein said means responsive to detected said amplitude modulation (AM) for generating said control signal, includes means responsive to the relative phase difference between the focus error signal and the detected amplitude modulation (AM) for generating said control signal.

11. The apparatus set forth in claim 10 wherein said means for generating said control signal includes a microprocessor.

12. The apparatus set forth in claim 10 further including,
first and second pulse formers responsive to the detected amplitude modulation (AM) and the focus error signal respectively for generating bilevel representations of said detected amplitude modulation (AM) and the focus error signal; and wherein said means for generating said control signal is responsive to said bilevel representations.

13. The apparatus set forth id claim 12 wherein said means for generating said control signal includes an exclusive OR circuit responsive to said bilevel representations for determining the relative phase difference between the focus error signal and the detected amplitude modulation (AM).

* * * * *

UNITED STATES PATENT AND TRADEMARK OFFICE
CERTIFICATE OF CORRECTION

PATENT NO. : 5,412,640

DATED : May 2, 1995

INVENTOR(S) : Friedrich Fuldner, Hans-Robert Kuhn and Dieter Storz

It is certified that error appears in the above-identified patent and that said Letters Patent is hereby corrected as shown below:

On the title page:

First page, "[57] ABSTRACT", line 12, delete "sin$\phi$" and insert ---sin$\varphi$---

First page, "[57] ABSTRACT", line 14, delete "cos$\phi$" and insert ---cos$\varphi$---

First page, "[57] ABSTRACT", line 14, delete "$\phi$ of the" and insert ---$\varphi$ of the---

Column 3, line 29, delete "FIG. 6 show" and insert ---FIG. 6 shows---

Column 4, line 28-29, delete "FIGS. 2c and 2b," and insert ---FIGS. 2c and 2h---

Column 4, line 35, delete "raduis angle $\phi$T" and insert ---radius angle $\phi$R---

Column 5, line 32, delete "C* sin ($\alpha$ + $\phi$)." and insert ---C* sin ($\alpha$ + $\varphi$).---

Column 5, line 38, delete "tg$\alpha$ = tg$\phi$ = A/B" and insert ---tg$\alpha$ = tg$\varphi$ = A/B---

Column 5, line 41, delete "sin $\phi$" and insert ---sin $\varphi$---

Column 5, line 42, delete "cos $\phi$" and insert ---cos $\varphi$---

UNITED STATES PATENT AND TRADEMARK OFFICE
CERTIFICATE OF CORRECTION

PATENT NO.  : 5,412,640
DATED       : May 2, 1995
INVENTOR(S) : Friedrich Fuldner, Hans-Robert Kuhn and Dieter Storz It is certified that error appears in the above-identified patent and that said Letters Patent is hereby corrected as shown below:

Column 6, line 44, delete "($\alpha + \phi$)" and insert ---($\alpha + \varphi$)---

Column 6, line 46, delete "sin $\phi$*" and insert ---sin $\varphi$*---

Column 6, line 47, delete "-C* cos $\phi$* sin $\alpha$" and insert --- -C* cos $\varphi$* sin $\alpha$---

Column 7, line 2, delete "A = C* sin $\phi$" and insert ---A = C* sin $\varphi$---

Column 7, line 3, delete "B = C* cos $\phi$" and insert ---B = C* cos $\varphi$---

Column 7, line 24, delete "tg$\phi$ = A/B = 9" and insert ---tg$\varphi$ = A/B = 9---

Column 7, line 26, delete tg$\phi$ = A/B = 0.11" and insert ---tg$\varphi$ = 0.11---

Signed and Sealed this

Twenty-third Day of September, 1997

Attest:

BRUCE LEHMAN

*Attesting Officer*          *Commissioner of Patents and Trademarks*